United States Patent
Kannan

(10) Patent No.: US 8,800,534 B2
(45) Date of Patent: Aug. 12, 2014

(54) FUEL RAIL MOUNTING ARRANGEMENT

(75) Inventor: Venkatesh Kannan, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 322 days.

(21) Appl. No.: 13/300,165

(22) Filed: Nov. 18, 2011

(65) Prior Publication Data
US 2013/0125864 A1     May 23, 2013

(51) Int. Cl.
| F02M 55/02 | (2006.01) |
| F02M 61/16 | (2006.01) |
| F16B 5/02 | (2006.01) |
| F16F 1/40 | (2006.01) |

(52) U.S. Cl.
CPC ............ *F02M 61/168* (2013.01); *F16B 5/0241* (2013.01); *F02M 2200/855* (2013.01); *F16F 1/40* (2013.01); *F16B 5/0258* (2013.01); *F02M 2200/857* (2013.01); *F02M 2200/9046* (2013.01); *F02M 2200/9015* (2013.01)
USPC .......................................... 123/469; 123/468

(58) Field of Classification Search
USPC ................................. 123/468–470
See application file for complete search history.

(56) References Cited

U.S. PATENT DOCUMENTS

| 2,460,829 | A | 2/1949 | Ivanovie |
| 3,756,551 | A | 9/1973 | Bishop |
| 5,743,509 | A | 4/1998 | Kanda et al. |
| 7,249,756 | B1 | 7/2007 | Wilke et al. |
| 7,334,571 | B1 | 2/2008 | Beardmore |
| 7,406,946 | B1 | 8/2008 | Watanabe et al. |
| 7,516,735 | B1 | 4/2009 | Doherty et al. |
| 7,591,246 | B2 | 9/2009 | Beardmore et al. |
| 7,793,639 | B2 | 9/2010 | Hunt et al. |
| 8,307,809 | B2 * | 11/2012 | Hay et al. ............ 123/469 |
| 2009/0235898 | A1 * | 9/2009 | Short ............ 123/470 |
| 2011/0073074 | A1 | 3/2011 | Hay et al. |
| 2013/0104852 | A1 * | 5/2013 | Kannan ............ 123/456 |

FOREIGN PATENT DOCUMENTS

| DE | 3919775 | 10/1990 |
| DE | 4421878 | 1/1996 |
| GB | 2204935 | 11/1988 |
| WO | 91/11607 | 8/1991 |
| WO | 2009/129520 | 10/2009 |
| WO | 2010/101693 | 9/2010 |

OTHER PUBLICATIONS

International Search Report and Written Opinion for Application No. PCT/US2012/062523 dated Feb. 18, 2013 (12 pages).
International Search Report and Written Opinion for Application No. PCT/US2012/062143 dated Feb. 18, 2013 (10 pages).
International Search Report and Written Opinion for Application No. PCT/US2012/062523 dated Apr. 18, 2013 (14 pages).

* cited by examiner

Primary Examiner — Thomas Moulis
Assistant Examiner — Joseph Dallo
(74) *Attorney, Agent, or Firm* — Michael Best & Friedrich LLP

(57) ABSTRACT

A vibration isolation fuel rail mounting arrangement is configured for in-plane shear type damping by spacing the mid-width points of the elastomer compression areas of two stacked-layer isolators away from the central fastener axis by a distance between about 1.5 times the bolt diameter and about 3.0 times the bolt diameter.

14 Claims, 7 Drawing Sheets

US 8,800,534 B2

FUEL RAIL MOUNTING ARRANGEMENT

BACKGROUND

The present invention relates to structures for reducing noise due to vibration in fuel rails. For example, applications such as direct injection engines having high pressure fuel injectors mounted directly in a cylinder head of the engine create substantial noise under certain conditions unless specific countermeasures are taken.

Known isolation mounts for high pressure fuel rails provide a reduction in unwanted fuel system noise, but generally rely on simple compression of an elastomeric material. Although mounts with compression limiters have been developed that allow a bolt of the mount to be tightened beyond the compressive preload amount applied to the elastomeric material, damping capabilities are generally limited, and the compressed elastomeric material will inherently suffer from compression reduction as the elastomeric material ages.

SUMMARY

In one aspect, the invention provides a vibration isolation fuel rail mounting arrangement. A fuel rail has a mounting portion having an aperture. A fastener extends through the aperture along a central axis. The fastener has a first end and, an opposed second end, and a diameter d. The fastener is configured to secure the fuel rail with respect to a support member. A first stacked-layer isolator is positioned on a first side of the mounting portion, compressed between the first end of the fastener and the mounting portion of the fuel rail by tightening of the fastener. The first stacked-layer isolator includes an elastomer layer having a compression area spaced away from the fastener and extending across a width measured in a radial direction. A mid-width point is defined halfway along the width of the compression area. A second stacked-layer isolator is positioned on a second side of the mounting portion, compressed between the mounting portion and the support member by tightening of the fastener. The second stacked-layer isolator includes an elastomer layer having a compression area spaced from the fastener and extending across a width measured in a radial direction. A mid-width point is defined halfway along the width of the compression area. The mid-width point of each elastomer layer compression area is spaced away from the central axis by a distance between about 1.5d and about 3.0d.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
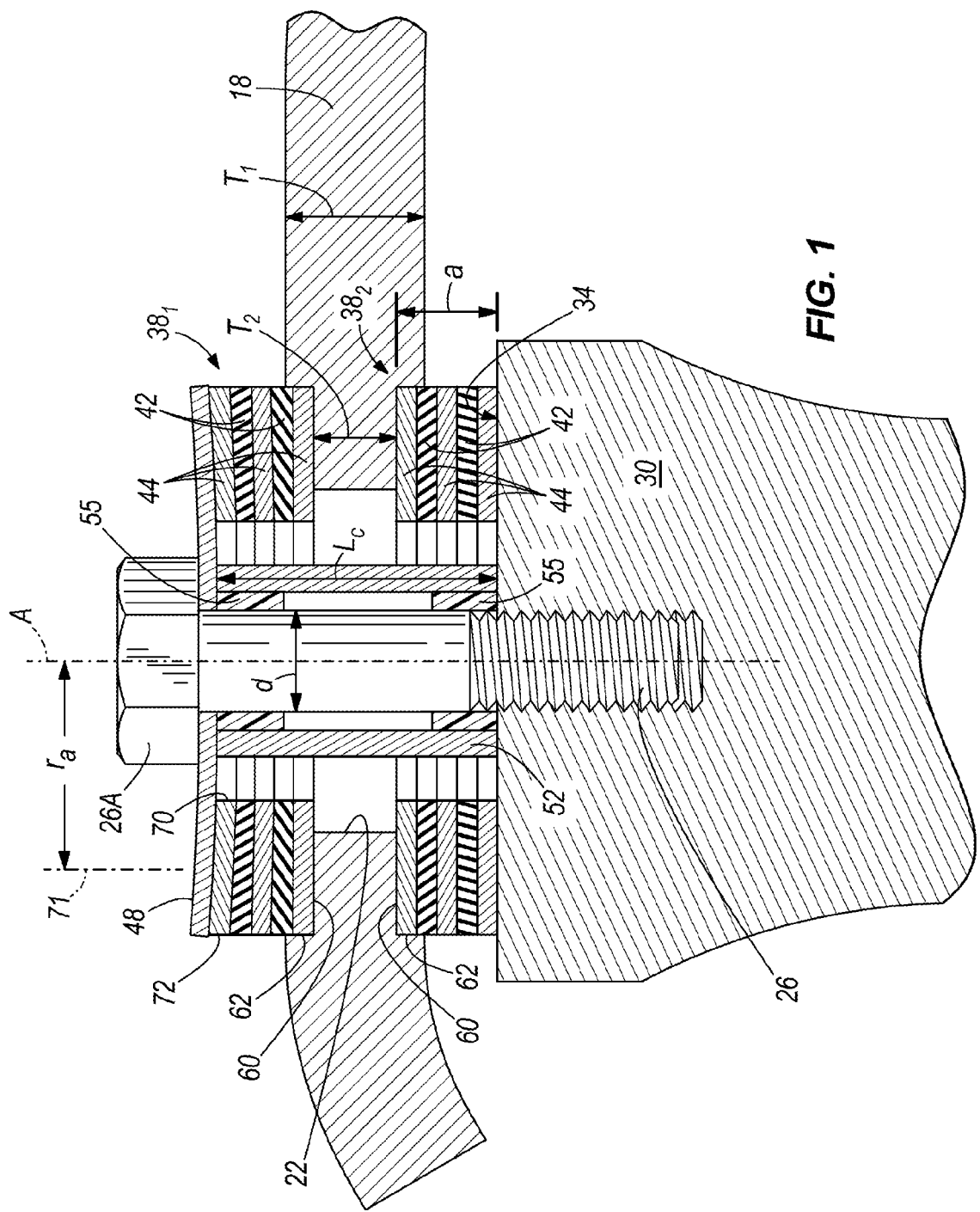
FIG. 1 is a cross-sectional view of a vibration isolation fuel rail bracket mounting arrangement, or mount, according to one aspect of the present invention.

FIG. 1 illustrates a fuel rail 10 for conveying fuel from a fuel source (e.g., a fuel pump pumping fuel from a storage tank) to an internal combustion engine. A plurality of fuel injectors 12 (FIG. 2) are coupled to the fuel rail 10 to receive fuel from the fuel source (via an internal passage 14 of the rail 10) and inject a metered quantity of fuel into the engine for combustion. The fuel rail 10 includes a mounting portion (e.g., a plurality of mounting brackets or bosses 18, one of which is shown in FIG. 1). The mounting boss 18 includes a mounting aperture 22. A fastener, which can be a bolt 26 or other threaded fastener for example, extends through the aperture 22 along a central axis A and engages a support member 30. In this way, the bolt 26 secures the fuel rail 10 with respect to the support member 30, although other fastener types and means for securing the fuel rail 10 may be employed. In some constructions, the support member 30 is a portion of a cylinder head of the engine or a standoff 34 coupled to the cylinder head. The cylinder head can include any known configuration of intake and exhaust passages and corresponding intake and exhaust valves, and can at least partially define the combustion chamber. In the illustrated construction, the standoff 34 includes a threaded aperture for engaging the bolt 26.

During operation of the engine, particularly a direct injection engine where fuel injection pressures are very high, dynamic forces exist that will generate unacceptable noise levels if not remedied. Thus, the mounting arrangement for the fuel rail 10 further includes a stacked-layer isolator 38 on each side of the mounting boss 18. As described in further detail below, the stacked-layer isolators 38 are constrained-layer type isolators that operate to take advantage of in-plane shear damping of elastomeric damping layers 42 to attenuate noise caused by vibration due to inertial forces and combustion forces. Each stacked-layer isolator 38 includes at least two blocks or rings 44 separated by an interposed elastomer layer 42. A first one of the stacked-layer isolators $38_1$ is positioned on a first side of the mounting boss 18 that is remote from the support member 30. The first stacked-layer isolator $38_1$ is compressed between a first end 26A (e.g., a head end) of the bolt 26 and the mounting boss 18 by tightening of the bolt 26. In the illustrated construction, a block or ring 48 is positioned between the first end 26A of the bolt 26 and the first stacked-layer isolator $38_1$ to serve as a cap member that transmits clamping force from the first end 26A of the bolt to the first stacked-layer isolator $38_1$. The cap member 48 can be a disc spring configured to undergo elastic deflection when the bolt 26 is tightened to a predetermined assembly torque. The elastic deflection in the cap member 48 maintains a compression preload in the elastomer layers 42 in spite of any relaxation compression set in the elastomer layers 42 due to aging, which would otherwise reduce or eliminate the compression preload in the elastomer layers 42, degrading the vibration isolation performance. In other constructions, the first end 26A of the bolt 26 or other fastener can be formed with an integral force-transmitting member, such as a flange, to apply compression directly to the first stacked-layer isolator $38_1$. A second stacked-layer isolator $38_2$ is positioned on a second side of the mounting boss 18, opposite the first side and closer to the support member 30. The second stacked-layer isolator $38_2$ is compressed between the mounting boss 18 and the support member 30 by tightening of the bolt 26. The second stacked-layer isolator $38_2$ can be supported directly or indirectly by a support surface 34 of the support member 30. Each stacked-layer isolator 38 has an axial height a, which varies slightly with compression of the elastomer layers 42, and the two stacked-layer isolators 38 are separated by the local thickness $T_2$ of the mounting boss 18.

A compression limiter 52 is positioned between the first end 26A of the bolt 26 and the support member 30. As illustrated, the compression limiter 52 is formed generally as a sleeve or hollow cylinder in the construction of FIG. 1. The compression limiter 52 is spaced from the exterior of the bolt 26. The position of the compression limiter 52 is secured relative to the axis A by one or more retainer elements 55 (e.g., plastic rings). Alternately, the compression limiter 52 could be positioned in a counterbore provided in the support member 30 that corresponds to the exterior shape of the compression limiter 52. The compression limiter 52 has an axial height $L_c$ configured to limit (but not prevent) the axial compression applied to the elastomer layers 42 of the two stacked-layer isolators 38, so that the elastomer layers 42 are only compressed up to a predetermined maximum amount. In other words, as the bolt 26 is tightened up to a predetermined torque, an initial compression of the stacked-layer isolators 38 occurs as the cap member 48 is forced onto the stacked layer isolator $38_1$ (compressing both stacked layer isolators $38_1$, $38_2$ and the mounting boss 18 between the cap member 48 and the support member 30) before the cap member 48 abuts the compression limiter 52. To ensure that the stacked-layer isolators 38 are compressed prior to abutment of the compression limiter 52, the uncompressed sum height (2*a) of the two isolators 38 plus the local thickness $T_2$ of the mounting boss 18 between the isolators 38 is slightly larger than the distance equal to the height $L_c$ of the compression limiter 52. Once the predetermined amount of compression is applied to the stacked-layer isolators 38 through bolt tightening, the compression limiter 52 becomes sandwiched (directly or indirectly, but without slack) between the first end 26A of the bolt 26 and the support member 30. As the bolt 26 is further tightened from this point, the compression limiter 52 bears the full reaction force of the tensile preload in the bolt 26 while the stacked-layer isolators 38 only experience the initial preload compression, which can be fine-tuned by control of the relative heights of the components. This allows the bolt 26 to be tightened corresponding to a predetermined tensile preload required to prevent loosening during operation of the engine, without over-compressing the elastomer layers 42.

As shown in FIG. 1, the mounting boss 18 of the fuel rail 10 also includes a recess 60 (e.g., counterbore) adjacent each end of the mounting aperture 22 for receiving one of the isolators 38. Thus, the thickness (axial direction) of the mounting boss 18 in the area of the recesses 60 is reduced to the dimension $T_2$ from the greater nominal thickness $T_1$ of the mounting boss 18. Each recess 60 creates a lateral shoulder 62 that secures the position of the corresponding isolator 38 relative to the bolt 26 and the axis A.

Each of the stacked-layer isolators 38 has an inner edge 70 and an outer edge 72, defining a compression area, or compression width, therebetween. In the illustrated construction, the inner edges 70 of both stacked-layer isolators 38 are generally aligned (equidistant from the central axis A), and the outer edges 72 of both stacked layer isolators 38 are also generally aligned. Because the stacked-layer isolators 38 are annular in the illustrated construction, it should be understood that the inner edge 70 of each isolator 38 forms an inner diameter of the isolator 38, and the outer edge 72 of each isolator 38 forms an outer diameter of the isolator 38. However, other constructions are optional, some of which are described further below. As shown in FIG. 1, the inner edges 70 of the isolators 38 are spaced away from the outside of bolt 26. A mid-width point 71 is defined halfway between the inner 70 and outer 72 edges along a radial path from the central axis A. The mid-width point 71 is effectively the location, or radius, of the material center of the isolators 38. A spacing distance $r_a$ is defined from central axis A to the mid-width point 71. Because of the substantial spacing of the inner edges 70 away from the outside of the bolt 26, the spacing distance $r_a$ is between about 1.5 times the bolt diameter (1.5d) and about 3.0 times the bolt diameter (3.0d).

By providing a spacing distance $r_a$ in this range, the damping mechanism in the stacked-layer isolators 38 is significantly biased to in-plane shear type damping rather than compression damping. Thus, the viscous shear damping of the surface layers of each elastomer layer 42 against the adjacent rigid rings 44 is taken advantage of in spite of the fact that the mating surfaces of the elastomer layers 42 and the rings 44 are oriented generally perpendicular to the central axis A (i.e., the axis of bolt compression). This arrangement forces primarily in-plane shear damping, and the damping performance of the stacked-layer isolators 38 is very efficient in vibration absorption compared to its size. This is advantageous to provide maximum damping with minimal packaging space requirements. Having the spacing distance $r_a$ less than about 1.5d does not generate enough in-plane shear type damping, relying instead on compressive damping action, which limits the overall damping capability. Having the spacing distance $r_a$ greater than about 3.0d introduces an increasingly severe penalty in packaging size, which is generally not justified for the small gain in in-plane shear damping action. In modern internal combustion engine applications, for automobiles for example, it may not even be feasible to increase the spacing distance $r_a$ beyond 3.0d, as small overall packaging is of utmost importance.

Figure 2:
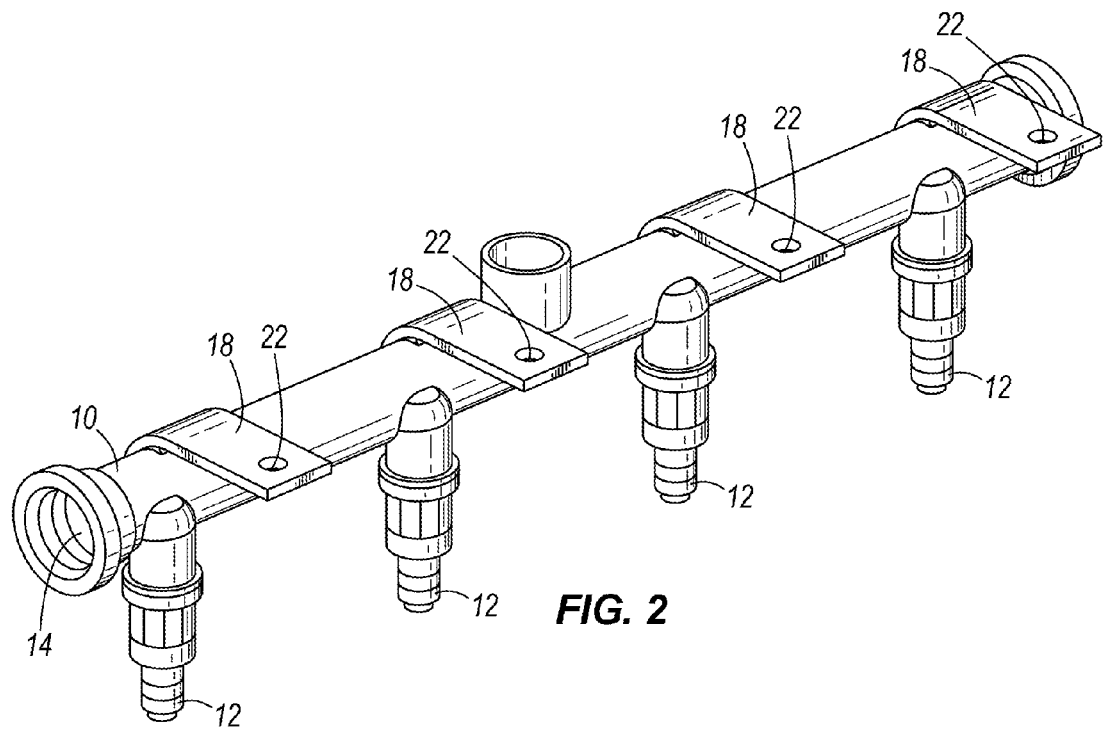
FIG. 2 is a perspective view of a fuel rail having mounting brackets.
Figure 3:
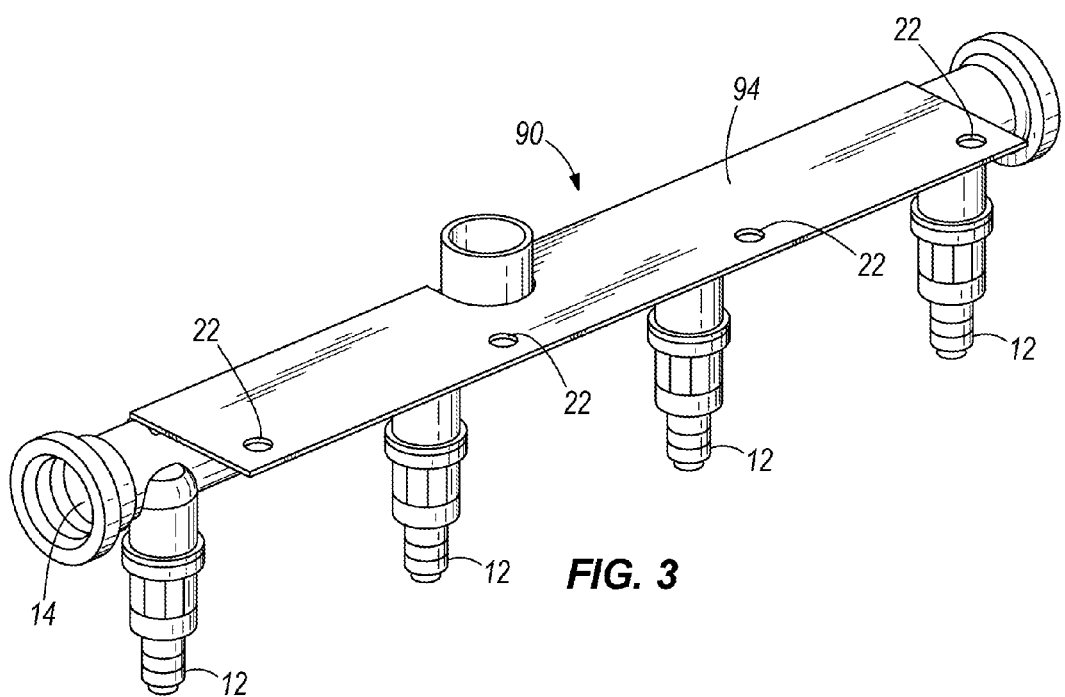
FIG. 3 is a perspective view of a fuel rail having a sheet-formed waveguide mounting portion.

As discussed briefly above, the vibration-absorption fuel rail mounting arrangement of FIG. 1 is illustrated as mounting a fuel rail 10 having the general construction shown in FIG. 2 in which a plurality of discrete, rigid mounting brackets or bosses 18 are provided along the length of the fuel rail 10. However, a similar vibration-absorption mounting arrangement may be utilized for mounting a fuel rail 90 having the general construction of FIG. 3. As shown in FIG. 3, the fuel rail 90 supplies fuel to a plurality of fuel injectors 12 and is provided with a mounting portion constituted by a thin sheet-formed waveguide 94 that extends a majority of the entire length of the fuel rail 90, rather than discrete rigid bosses. The waveguide 94 includes a plurality of mounting apertures 22. FIGS. 4-8 illustrate various vibration absorption mounting arrangements for mounting the fuel rail 90 with the sheet-formed waveguide 94 to a support member 30. Common reference characters are used where appropriate, and it should be understood that various aspects of the mounting arrangements of FIG. 1 and those of FIGS. 4-8 may be combined or exchanged in various combinations unless expressly prohibited. Only one side of each mounting arrangement is shown in cross-section in each of FIGS. 4-8 to allow illustration in greater detail, but it will be understood that the opposing side is a mirror image across the central axis A.

Figure 4:
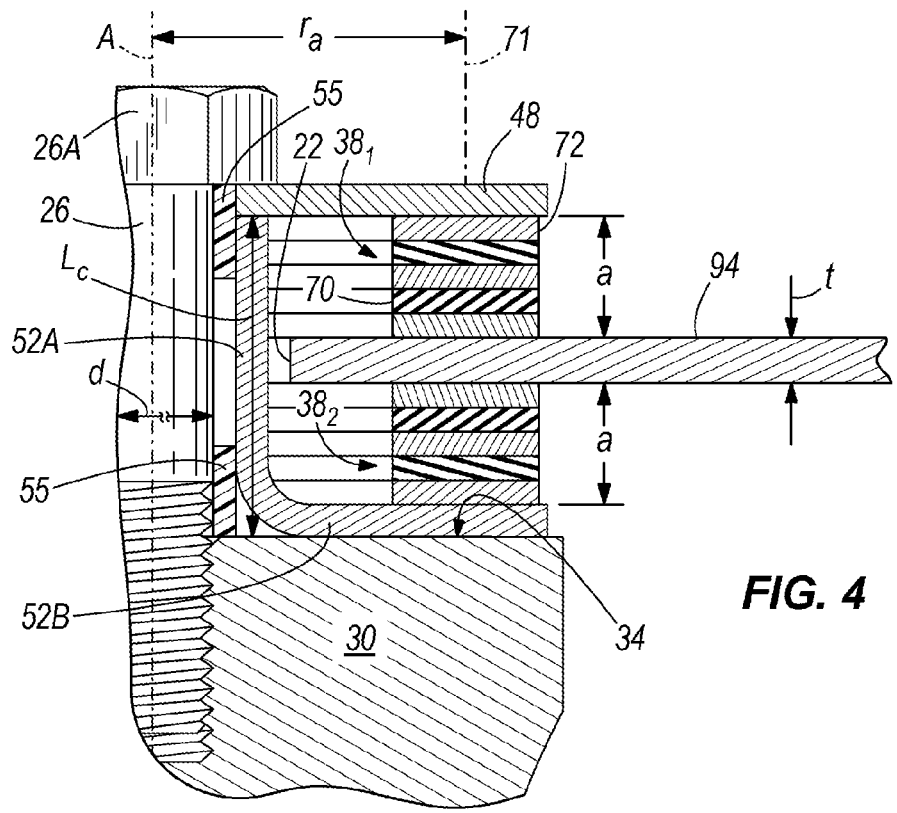
FIG. 4 is a is a cross-sectional view of a vibration isolation fuel rail waveguide mounting arrangement, or mount, according to one aspect of the present invention.

FIG. 4 illustrates a fuel rail mounting arrangement in which a fastener, (e.g., a bolt 26 or other threaded fastener) extends through the aperture 22 in the waveguide mounting portion 94 of the fuel rail 90 along a central axis A and engages a support member 30. In this way, the bolt 26 secures the fuel rail 90 with respect to the support member 30, although other fastener types and means for securing the fuel rail 90 may be employed. In some constructions, the support member 30 is a portion of a cylinder head of the engine or a standoff coupled to the cylinder head. In the illustrated construction, the support member 30 includes a threaded aperture for engaging the bolt 26.

The mounting arrangement for the fuel rail 90 further includes a stacked-layer isolator 38 on each side of the waveguide 94. As described in further detail below, the stacked-layer isolators 38 are constrained-layer type isolators that operate to take advantage of in-plane shear damping of elastomeric damping layers 42 to attenuate noise caused by vibration due to inertial forces and combustion forces. Each stacked-layer isolator 38 includes at least two blocks or rings 44 separated by an interposed elastomer layer 42. A first one of the stacked-layer isolators $38_1$ is positioned on a first side of the waveguide 94 that is remote from the support member 30. The first stacked-layer isolator $38_1$ is compressed between a first end 26A (e.g., a head end) of the bolt 26 and the waveguide 94 by tightening of the bolt 26. In the illustrated construction, a cap member 48 is positioned between the first end 26A of the bolt 26 and the first stacked-layer isolator $38_1$ to transmit clamping force from the first end 26A of the bolt to the first stacked-layer isolator $38_1$. Although not shown deflected in FIG. 4, the cap member 48 can be a disc spring configured to undergo elastic deflection when the bolt 26 is tightened to a predetermined assembly torque. The elastic deflection in the cap member 48 maintains a compression preload in the elastomer layers 42 in spite of any relaxation compression set in the elastomer layers 42 due to aging, which would otherwise reduce or eliminate the compression preload in the elastomer layers 42, degrading the vibration isolation performance. In other constructions, the first end 26A of the bolt 26 or other fastener can be formed with an integral force-transmitting member, such as a flange, to apply compression directly to the first stacked-layer isolator $38_1$. A second stacked-layer isolator $38_2$ is positioned on a second side of the waveguide 94, opposite the first side and closer to the support member 30. The second stacked-layer isolator $38_2$ is compressed between the waveguide 94 and the support member 30 by tightening of the bolt 26. The second stacked-layer isolator $38_2$ can be supported directly or indirectly by a support surface 34 of the support member 30. Each stacked-layer isolator 38 has an axial height a, which varies slightly with compression of the elastomer layers 42, and the two stacked-layer isolators 38 are separated by the thickness t of the waveguide 94.

A compression limiter 52 is positioned between the first end 26A of the bolt 26 and the support member 30. As illustrated, the compression limiter 52 includes a sleeve portion 52A adjacent the bolt 26, and a shoe portion 52B that is interposed between the second stacked-layer isolator $38_2$ and the support surface 34. In the illustrated construction, the compression limiter 52 is formed with both the sleeve portion 52A and the shoe portion 52B as an integral (e.g., stamped or deep drawn metal) piece, but other constructions are optional. The sleeve portion 52A of the compression limiter 52 is spaced from the exterior of the bolt 26 by a pair of axial bolt retainers 55. The retainers 55 are plastic rings in some constructions. The retainers 55 secure the position of the compression limiter 52 relative to the axis A. The compression limiter 52 has an axial height $L_c$ configured to limit (but not prevent) the axial compression applied to the elastomer layers 42 of the two stacked-layer isolators 38, so that the elastomer layers 42 are only compressed up to a predetermined maximum amount. In other words, as the bolt 26 is tightened up to a predetermined torque, an initial compression of the stacked-layer isolators 38 occurs as the cap member 48 is forced onto the first stacked layer isolator $38_1$ (compressing both stacked layer isolators $38_1$, $38_2$ and the waveguide 94 between the cap member 48 and the support member 30) before the cap member 48 abuts the compression limiter 52. To ensure that the stacked-layer isolators 38 are compressed prior to abutment of the compression limiter 52, the uncompressed sum height (2*a) of the two isolators 38 plus the local thickness t of the waveguide 94 between the isolators 38 is slightly larger than the distance equal to the height $L_c$ of the compression limiter 52 minus the axial dimension of the shoe portion 52B. Once the predetermined amount of compression is applied to the stacked-layer isolators 38 through bolt tightening, the compression limiter 52 becomes sandwiched (directly or indirectly, but without slack) between the first end 26A of the bolt 26 and the support member 30. As the bolt 26 is further tightened from this point, the compression limiter 52 bears the full reaction force of the tensile preload in the bolt 26 while the stacked-layer isolators 38 only experience the initial preload compression, which can be fine-tuned by control of the relative heights of the components. This allows the bolt 26 to be tightened corresponding to a predetermined tensile preload required to prevent loosening during operation of the engine, without over-compressing the elastomer layers 42.

Each of the stacked-layer isolators 38 has an inner edge 70 and an outer edge 72, defining a compression area, or compression width, therebetween. In the illustrated construction, the inner edges 70 of both stacked-layer isolators 38 are generally aligned (equidistant from the central axis A), and the outer edges 72 of both stacked layer isolators 38 are also generally aligned. Because the stacked-layer isolators 38 are annular in the illustrated construction, it should be understood that the inner edge 70 of each isolator 38 forms an inner diameter of the isolator 38, and the outer edge 72 of each isolator 38 forms an outer diameter of the isolator 38. However, other constructions are optional, some of which are described further below. As shown in FIG. 4, the inner edges 70 of the isolators 38 are spaced away from the outside of bolt 26. A mid-width point 71 is defined halfway between the inner 70 and outer 72 edges along a radial path from the central axis A. The mid-width point 71 is effectively the location, or radius, of the material center of the isolators 38. A spacing distance $r_a$ is defined from central axis A to the mid-width point 71. Because of the substantial spacing of the inner edges 70 away from the outside of the bolt 26, the spacing distance $r_a$ is between about 1.5 times the bolt diameter (1.5d) and about 3.0 times the bolt diameter (3.0d). As described above, this ensures that the isolators 38 will take advantage of in-plane shear type damping despite the fact that the mating surfaces of the elastomer layers 42 and the rings 44 are oriented generally perpendicular to the central axis A (i.e., the axis of bolt compression).

Figure 5:
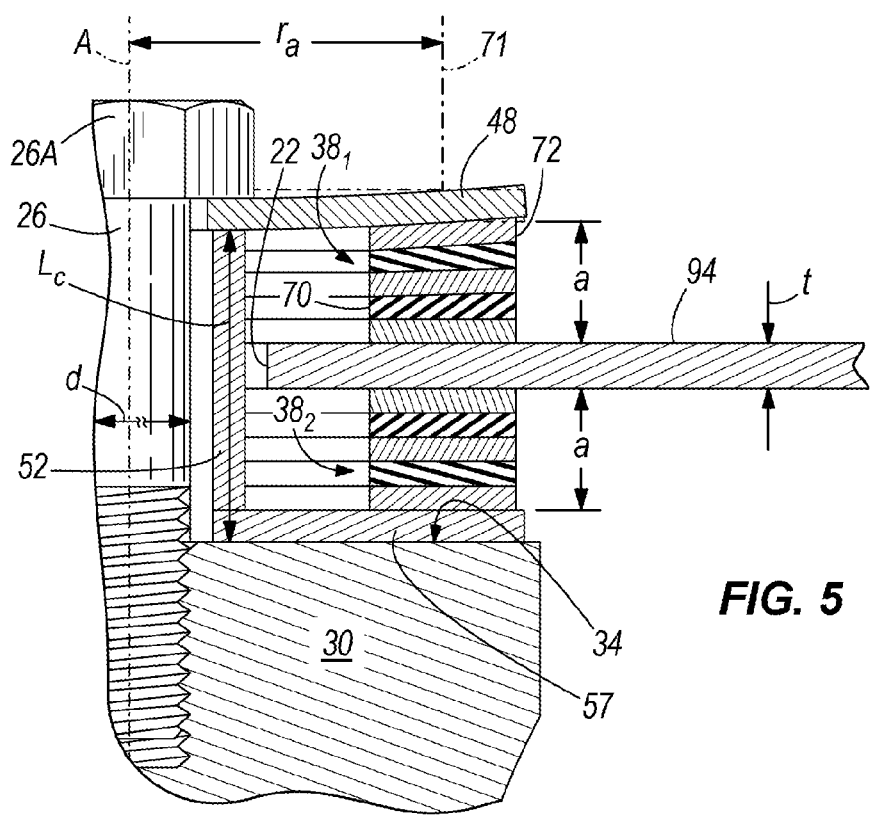
FIG. 5 is a is a cross-sectional view of a vibration isolation fuel rail waveguide mounting arrangement, or mount, according to another aspect of the present invention.

FIG. 5 illustrates a fuel rail mounting arrangement which is similar in most respects to that of FIG. 4. Therefore, the description of the mounting arrangement of FIG. 5 is limited to those features unique to FIG. 5, and it will be understood that other aspects are addressed by the description above. To this end, similar reference characters are used where appropriate.

The mounting arrangement of FIG. 5 includes a sleeve-like compression limiter 52 positioned around the bolt 26, and a separate shoe member 57 is positioned between the second stacked-layer isolator $38_2$ and the support surface 34 of the support member 30. The radially inner side of the shoe member 57 is positioned under the compression limiter 52 to distribute the axial bolt reaction force borne by the compression limiter 52. This can help avoid indentation of the support member 30, which in some constructions, may be an aluminum cylinder head. The effective height $L_c$ of the compression limiter 52 includes the thickness of the shoe member 57 in such a construction. Although not illustrated, one or more axial bolt retainers like the elements 55 of FIG. 4 may also be provided. FIG. 5 also provides a visual representation of the cap member 48 being axially, elastically deflected by the tightening of the bolt 26.

Figure 6:
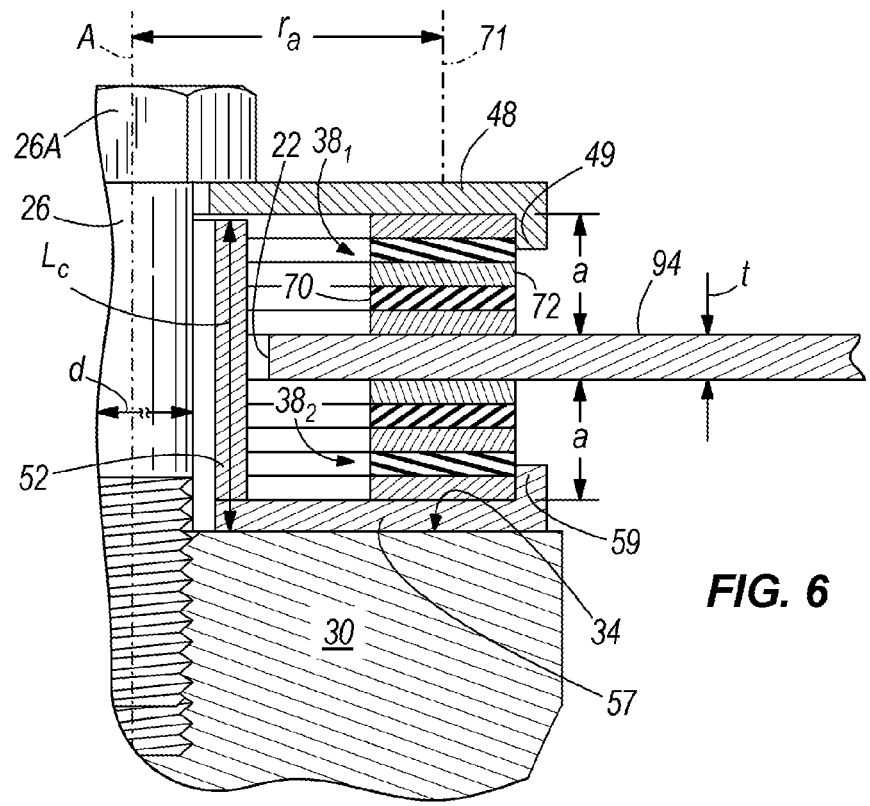
FIG. 6 is a is a cross-sectional view of a vibration isolation fuel rail waveguide mounting arrangement, or mount, according to another aspect of the present invention.

FIG. 6 illustrates a fuel rail mounting arrangement which is similar in most respects to that of FIG. 5. Therefore, the description of the mounting arrangement of FIG. 6 is limited to those features unique to FIG. 6, and it will be understood that other aspects are addressed by the description above. To this end, similar reference characters are used where appropriate.

The mounting arrangement of FIG. 6 includes a shoe member 57 which is separate from the sleeve-like compression limiter 52 similar to the arrangement of FIG. 5. The shoe member 57 is positioned between the second stacked-layer isolator $38_2$ and the support surface 34 of the support member 30. However, the shoe member 57 is provided with additional structure to securely position the second stacked-layer isolator $38_2$. The shoe member 57 is provided with an outer retaining flange 59 configured to secure the position of the second stacked-layer isolator $38_2$ relative to the central axis A. The retaining flange 59 is positioned at the radial outer edge of the shoe member 57 to engage the outer edge 72 of the second stacked-layer isolator $38_2$. Likewise, the cap member 48 is provided with a retaining flange 49 at its radially outer edge configured to engage the outer edge 72 of the first stacked-layer isolator $38_1$ to secure the position thereof relative to the central axis A. Although not illustrated, one or more axial bolt retainers like the retainers 55 of FIG. 4 may also be provided. FIG. 6 also provides a visual representation of the mounting arrangement in an assembled, but uncompressed state. A gap is illustrated between the cap member 48 and the compression limiter 52. From the state illustrated in FIG. 6, further tightening of the bolt 26 will close the gap, providing the predetermined amount of compression in the elastomer layers 42 of the isolators 38. Once the cap member 48 is pressed tightly against the compression limiter 52, further tightening of the bolt 26 will increase the preload of the bolted joint without over-compressing the elastomer layers 42.

Figure 7:
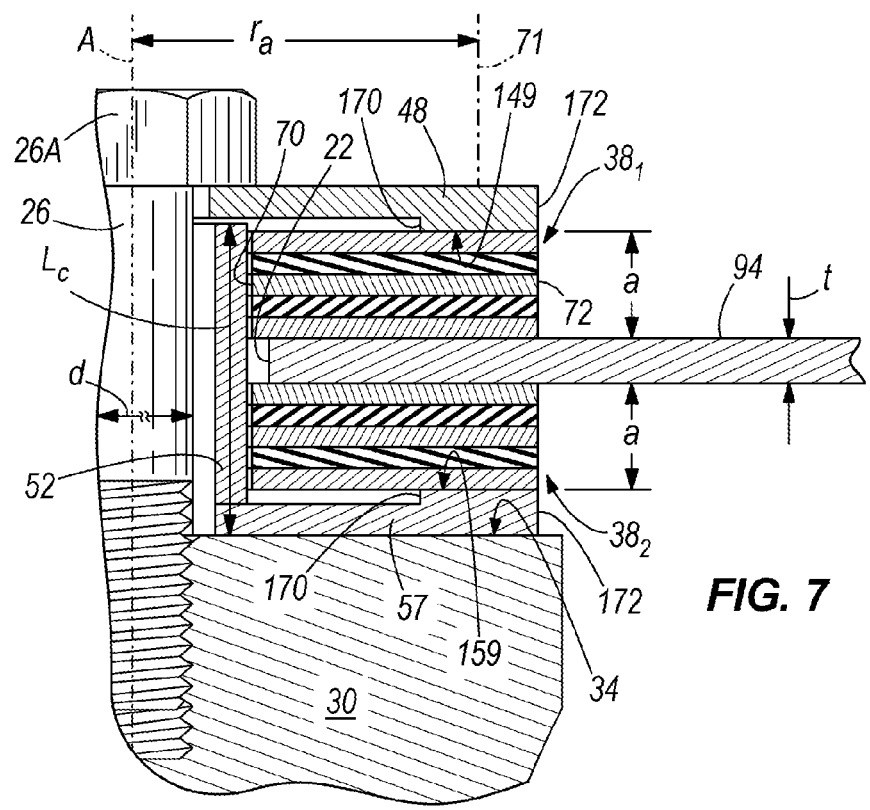
FIG. 7 is a is a cross-sectional view of a vibration isolation fuel rail waveguide mounting arrangement, or mount, according to another aspect of the present invention.

FIG. 7 illustrates a fuel rail mounting arrangement which is similar in many respects to that of FIG. 5. Therefore, the description of the mounting arrangement of FIG. 7 is limited to those features unique to FIG. 7, and it will be understood that other aspects are addressed by the description above. To this end, similar reference characters are used where appropriate.

The stacked-layer isolators 38 of FIG. 7 are not compressed over the entire span between their inner edges 70 and their outer edges 72. In comparison to the constructions described above, the inner edges 70 are not spaced as far away from the bolt 26, and the compression area, or compression width (i.e., the radial dimension of the portion of the isolator 38 that is actually clamped), is focused toward the outer edge 72. In fact, as shown in FIG. 7, the inner edges 70 of the isolators 38 can abut the outside of the compression limiter 52. A contact pad 149 is provided at the outer edge of the cap member 48, and a similar contact pad 159 is provided at the outer edge of the shoe member 57. The contact pads 149, 159 are areas of locally increased thickness (measured in the axial direction) to delimit a contact area for contacting and compressing the first and second stacked-layer isolators 38 and defining the compression area, which is less than the entire width of the isolators 38. In contrast to above-described constructions, the mid-width point 71 of the compression area does not coincide with the midway point between the inner and outer edges 70, 72 of the isolators 38 themselves. Rather, since the compression area is limited by the contact pads 149, 159, the mid-width point 71 is the point radially intermediate the inner edges 170 of the contact pads 149, 159 and the outer edges 172 of the contact pads 149, 159. Although not necessarily required, the inner edges 170 of the cap and shoe members 48, 57 are generally aligned, and the outer edges 172 of the cap and shoe members 48, 57 are also generally aligned so that the mid-width point 71 is the same for both isolators 38. Like the above-described mounting arrangements, the arrangement of FIG. 7 defines a spacing distance $r_a$ from the central axis A to the mid-width point 71. The spacing distance $r_a$ is between about 1.5 times the bolt diameter (1.5d) and about 3.0 times the bolt diameter (3.0d). As described above, this ensures that the isolators 38 will take advantage of in-plane shear type damping despite the fact that the mating surfaces of the elastomer layers 42 and the rings 44 are oriented generally perpendicular to the central axis A (i.e., the axis of bolt compression). A small radial gap between the outside of the compression limiter 52 and the inner edges 70 of the stacked-layer isolators 38 ensures that the isolators 38 have sufficient freedom for in-plane shear movement.

Figure 8:
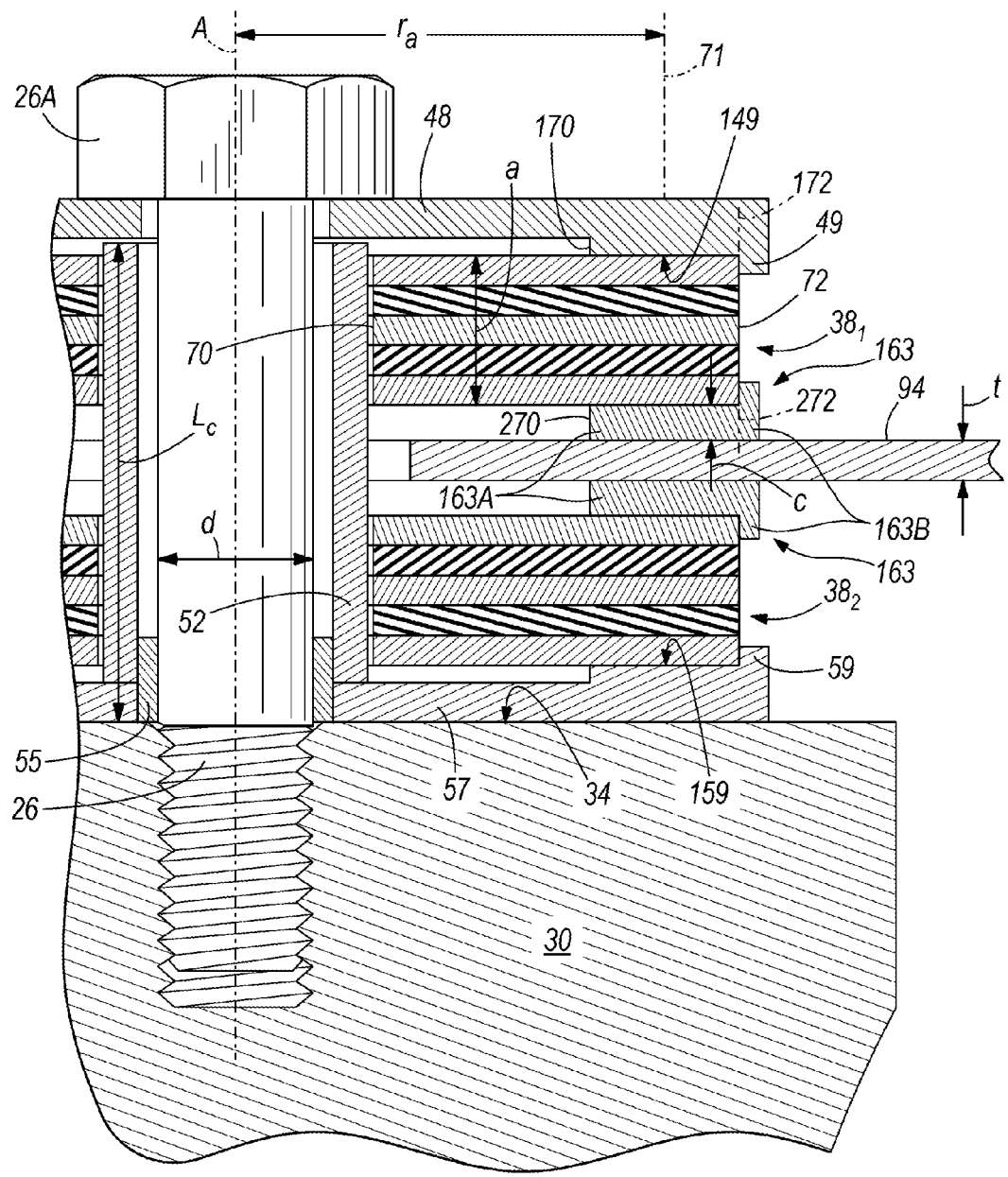
FIG. 8 is a is a cross-sectional view of a vibration isolation fuel rail waveguide mounting arrangement, or mount, according to another aspect of the present invention.

FIG. 8 illustrates a fuel rail mounting arrangement which is similar in many respects to that of FIG. 7. Therefore, the description of the mounting arrangement of FIG. 8 is limited to those features unique to FIG. 8, and it will be understood that other aspects are addressed by the description above. To this end, similar reference characters are used where appropriate.

The fuel rail mounting arrangement of FIG. 8 utilizes a cap member 48 and a shoe member 57 that have respective contact pads 149, 159 of increased thickness to define a compression area that is focused to the radially outer part of the stacked-layer isolators 38. Furthermore, retaining flanges 49, 59 like those of FIG. 6 are also provided on the cap member 48 and the shoe member 57. Thus, the outer edge 172 of each contact pad 149, 159 is defined at the inside of the respective retaining flange 49, 59. The mounting arrangement further includes a positioning feature for the sides of the isolators 38 facing the fuel rail mounting portion (e.g., waveguide 94). In the illustrated construction, the positioning features include two separate rings 163. Each positioning ring 163 includes a base portion 163A that lies adjacent the waveguide 94, and an outer rim or flange portion 163B that engages the outer edge 72 of the respective stacked-layer isolator 38 to secure the position of the isolator 38. The positioning rings 163 can be bonded (e.g., welded, adhesively bonded, etc.) to the waveguide 94, or formed integrally as a single-piece with the waveguide 94 in some constructions. When configuring the mounting arrangement to provide the predetermined amount of compression in the elastomer layers 42, the axial heights of the positioning rings must be taken into account accordingly. The mounting arrangement of FIG. 8 is illustrated in the uncompressed state. Thus, a small gap is present between the top of the compression limiter 52 and the underside of the cap member 48.

Although the inner edges 70 of the stacked-layer isolators 38 are positioned relatively close to the bolt 26, the compression area is limited to the outer portion of the isolators 38 which is clamped between the corresponding contact pad 149, 159 and the base portion 163A of the corresponding positioning ring 163. In the illustrated construction, the base portion 163A of each of the positioning rings 163 has an inner edge 270 and an outer edge 272. Similar to the contact pads 149, 159 of the cap and shoe members 48, 57, the outer edge 272 of each positioning ring base 163A is defined at the inside of the corresponding outer retaining flange 163B. The inner edges 270 are generally aligned with the inner edges 170 of the contact pads 149, 159, and the outer edges 272 are generally aligned with the outer edges 172 of the contact pads 149, 159. Thus, the mid-width point 71 is the point radially intermediate the respective inner edges 170, 270 (of the cap and shoe contact pads 149, 159 and positioning rings 163), and the outer edges 172, 272 (of the cap and shoe contact pads 149, 159 and positioning ring bases 163A).

As described above with reference to the other constructions, a spacing distance $r_a$ is defined from the central axis A to the mid-width point 71. The spacing distance $r_a$ is between about 1.5 times the bolt diameter (1.5d) and about 3.0 times the bolt diameter (3.0d). As described above, this ensures that the stacked-layer isolators 38 will take advantage of in-plane shear type damping despite the fact that the mating surfaces of the elastomer layers 42 and the rings 44 are oriented generally perpendicular to the central axis A (i.e., the axis of bolt compression). A small radial gap between the outside of the compression limiter 52 and the inner edges 70 of the stacked-layer isolators 38 ensures that the isolators 38 have sufficient freedom for in-plane shear movement.

Figure 9:
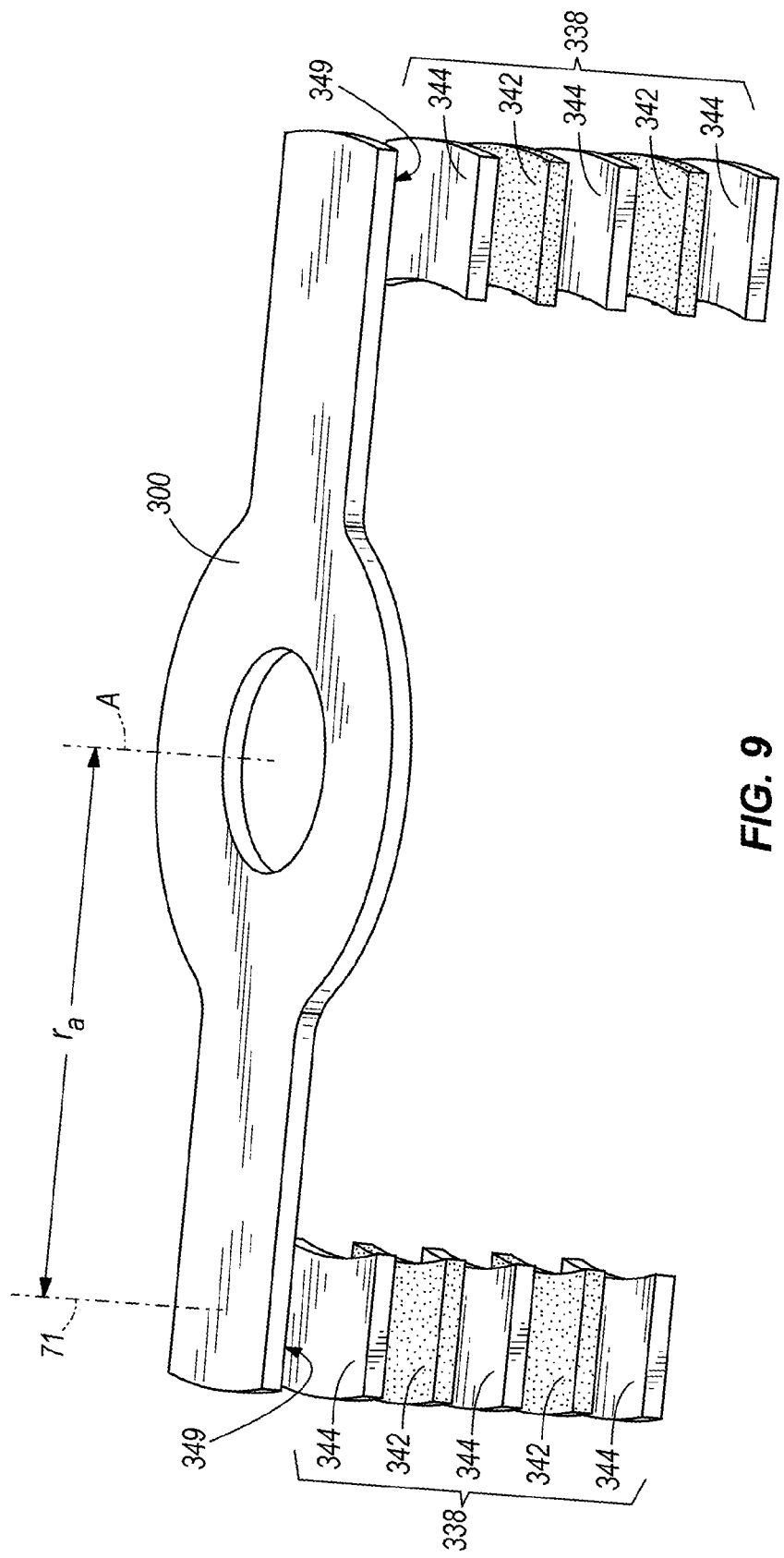
FIG. 9 is a perspective view of a non-annular cap or base and stacked-layer isolators of a vibration isolation fuel rail mount.

FIG. 9 illustrates an alternate cap or shoe member 300 and two alternate stacked-layer isolators 338. The cap or shoe member 300 is provided with two diametrically opposed legs, the ends of which provide two contact pads 349. Rather than extending a full 360 degrees about the central axis A like the stacked-layer isolators 38 of the previous figures, the isolators 338 extend less than 180 degrees about the central axis A. As illustrated, the stacked-layer isolators 338 are not ring-shaped at all but rather a stack of generally rectangular strips or blocks, including rigid (e.g., metallic) blocks 344 and interposed elastomer strips 342. Because the stacked-layer isolators 338 are not annular, two separate stacked-layer isolators 338 contact each cap/shoe member 300 as opposed to a single isolator 38 as described above with respect to the preceding constructions. Thus, a mounting arrangement utilizing the alternate stacked-layer isolators 338 of FIG. 9 can include one cap member 300 and/or one shoe member 300, and four separate stacked-layer isolators 338. Two isolators 338 are positioned between the cap member 300 and the fuel rail mounting portion (e.g., boss 18 or waveguide 94), positioned on opposing sides of the central axis A, and two additional stacked-layer isolators 338 are positioned between the fuel rail mounting portion (e.g., boss 18 or waveguide 94) and the remote support member 30 (or the shoe member 300 if provided), positioned on opposing sides of the central axis A. Such a mounting arrangement still conforms to the above-described principle of providing the mid-width point 71 of the compression area at a spacing distance $r_a$ from the central axis A that is between about 1.5d and about 3.0d. However, the mounting arrangement of FIG. 9 provides a narrower overall package, which may be desired or required for certain applications. Additional features of the preceding constructions, such as positioning features, may also be incorporated into the mounting arrangement of FIG. 9.

Figure 10:
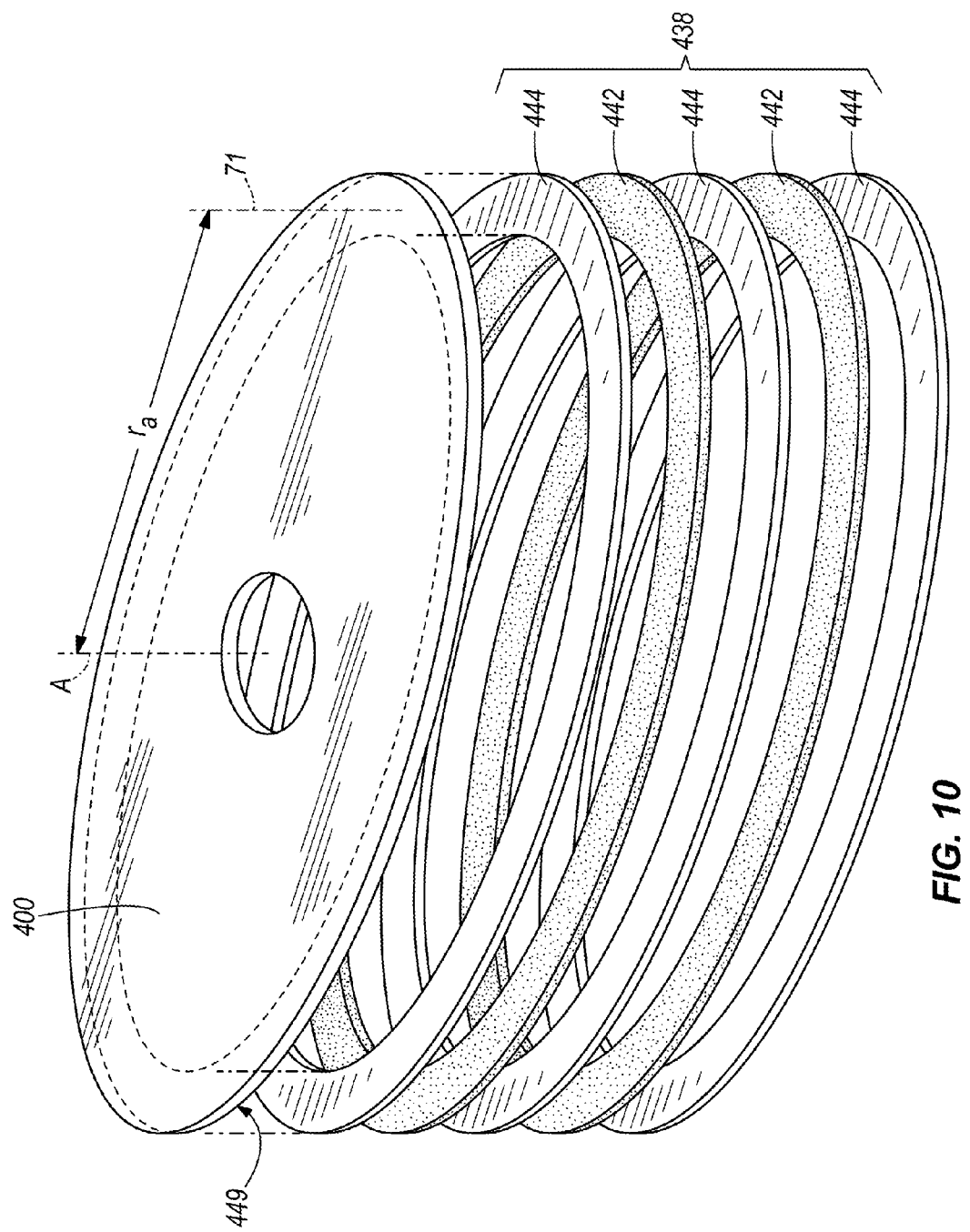
FIG. 10 is a perspective view of an elliptical cap or base and stacked-layer isolators of a vibration isolation fuel rail mount.

FIG. 10 illustrates another alternate cap or shoe member 400 and an alternate stacked-layer isolator 438. The cap or shoe member 400 has a generally elliptical shape when viewed along the central axis A. An elliptical contact pad 449 is defined adjacent the outer edge thereof. As illustrated, the stacked-layer isolator 438 extends a full 360 degrees about the central axis A, but is not ring-shaped (i.e., circular). Rather, the stacked-layer isolator 438 is generally elliptical as viewed along the central axis A and includes rigid (e.g., metallic) elliptical blocks 444 and interposed elliptical elastomer layers 442. Although the cap/shoe member 400 and the corresponding stacked-layer isolator 438 extend a full 360 degrees about the central axis A, the mounting arrangement of FIG. 10 can provide a narrower overall package than a mounting arrangement with ring-shaped components of a diameter equivalent to the major axis dimension of the ellipse (i.e., narrower measured across the necessarily smaller minor axis of the ellipse), which may be desired or required for certain applications. A mounting arrangement utilizing the alternate stacked-layer isolators 438 of FIG. 10 can include one cap member 400 and/or one shoe member 400, and two of the stacked-layer isolators 438. A first stacked-layer isolator 438 is positioned between the cap member 400 and the fuel rail mounting portion (e.g., boss 18 or waveguide 94), and a second stacked-layer isolator 438 is positioned between the fuel rail mounting portion (e.g., boss 18 or waveguide 94) and the remote support member 30 (or the shoe member 400 if provided). Such a mounting arrangement still conforms to the above-described principle of providing the mid-width point 71 of the compression area at a spacing distance $r_a$ from the central axis A that is between about 1.5d and about 3.0d. Additional features of the preceding constructions, such as positioning features, may also be incorporated into the mounting arrangement of FIG. 10.

Various features and advantages of the invention are set forth in the following claims.

What is claimed is:

1. A vibration isolation fuel rail mounting arrangement comprising:
   a fuel rail having a mounting portion;
   an aperture in the mounting portion of the fuel rail;
   a support member;
   a fastener extending through the aperture along a central axis, the fastener having a first end and, an opposed second end, and a diameter d, the fastener configured to secure the fuel rail with respect to the support member;
   a first stacked-layer isolator positioned on a first side of the mounting portion, compressed between the first end of the fastener and the mounting portion of the fuel rail by tightening of the fastener, the first stacked-layer isolator including an elastomer layer having a compression area spaced from the fastener and extending across a width measured in a radial direction, a mid-width point being defined halfway along the width of the compression area; and
   a second stacked-layer isolator positioned on a second side of the mounting portion, compressed between the mounting portion and the support member by tightening of the fastener, the second stacked-layer isolator including an elastomer layer having a compression area spaced away from the fastener and extending across a width measured in a radial direction, a mid-width point being defined halfway along the width of the compression area, wherein the mid-width point of each elastomer layer compression area is spaced away from the central axis by a distance between about 1.5d and about 3.0d; and wherein each of the first and second stacked-layer isolators includes a plurality of discrete rigid members and a plurality of discrete elastomer members arranged such that a discrete elastomer member defines an elastomer layer interposed between any two adjacent rigid members.

2. The vibration isolation fuel rail mounting arrangement of claim 1, wherein each of the first and second stacked-layer isolators extends a full 360 degrees about the central axis.

3. The vibration isolation fuel rail mounting arrangement of claim 2, wherein each of the first and second stacked-layer isolators is substantially ring-shaped as viewed along the central axis.

4. The vibration isolation fuel rail mounting arrangement of claim 2, wherein each of the first and second stacked-layer isolators is substantially elliptical as viewed along the central axis.

5. The vibration isolation fuel rail mounting arrangement of claim 1, wherein the mounting portion is one of a plurality of rigid brackets of the fuel rail.

6. The vibration isolation fuel rail mounting arrangement of claim 1, wherein the positions of the first and second stacked-layer isolators are fixed relative to the central axis by each of the first and second stacked-layer isolators having at least a portion fitting into a respective recess formed in the mounting portion.

7. The vibration isolation fuel rail mounting arrangement of claim 1, wherein the mounting portion is a sheet-formed waveguide of the fuel rail extending along a majority of the length of the fuel rail.

8. The vibration isolation fuel rail mounting arrangement of claim 1, wherein the first and second stacked-layer isolators extend less than 180 degrees about the central axis, the vibration isolation fuel rail mounting arrangement further comprising:

a third stacked-layer isolator positioned on the first side of the mounting portion of the fuel rail, the third stacked-layer isolator including an elastomer layer having a compression area spaced from the fastener and extending across a width measured in a radial direction, a mid-width point being defined halfway along the width of the compression area, the first and third stacked-layer isolators being positioned on opposing sides of the central axis; and a fourth stacked-layer isolator positioned on the second side of the mounting portion of the fuel rail, the fourth stacked-layer isolator including an elastomer layer having a compression area spaced away from the fastener and extending across a width measured in a radial direction, a mid-width point being defined halfway along the width of the compression area, the second and fourth stacked-layer isolators being positioned on opposing sides of the central axis, wherein the mid-width point of each elastomer layer compression areas of the third and fourth stacked-layer isolators is spaced away from the central axis by a distance between about 1.5d and about 3.0d; and wherein each of the third and fourth stacked-layer isolators includes a plurality of discrete rigid members and a plurality of discrete elastomer members arranged such that a discrete elastomer member defines an elastomer layer interposed between any two adjacent rigid members.

9. The vibration isolation fuel rail mounting arrangement of claim 1, further comprising a compression limiter positioned between the first end of the fastener and the support member and having an axial height configured to limit an amount of axial compression applied to the elastomer layers of the first and second stacked-layer isolators to a predetermined maximum amount.

10. The vibration isolation fuel rail mounting arrangement of claim 9, further comprising a cap positioned adjacent the first end of the fastener and configured to transfer tensile force within the fastener to the first stacked-layer isolator, wherein the cap is elastically deflected when the predetermined maximum amount of axial compression is applied to the elastomer layers of the first and second stacked-layer isolators.

11. The vibration isolation fuel rail mounting arrangement of claim 1, further comprising a cap positioned between the first end of the fastener and the first stacked-layer isolator, and a shoe positioned between the second stacked-layer isolator and the support member, wherein the cap and the shoe have respective outer retaining flanges configured to secure the position of the first and second stacked-layer isolators relative to the central axis.

12. The vibration isolation fuel rail mounting arrangement of claim 1, further comprising a cap positioned between the first end of the fastener and the first stacked-layer isolator, and a shoe positioned between the second stacked-layer isolator and the support member, wherein the cap and the shoe have respective contact pads delimiting the corresponding elastomer layer compression areas to a radial width smaller than a radial width of the elastomer layers.

13. The vibration isolation fuel rail mounting arrangement of claim 1, wherein each of the first and second stacked-layer isolators includes three discrete rigid members and two discrete elastomer members.

14. The vibration isolation fuel rail mounting arrangement of claim 8, wherein each of the third and fourth stacked-layer isolators includes three discrete rigid members and two discrete elastomer members.

* * * * *